US008079193B2

(12) United States Patent
Lien

(10) Patent No.: US 8,079,193 B2
(45) Date of Patent: Dec. 20, 2011

(54) HIDDEN EDGE CONNECTOR FOR MOUNTING PANEL TO FRAME OPENING

(76) Inventor: Chin-Hsiung Lien, El Monte, CA (US)

( * ) Notice: Subject to any disclaimer, the term of this patent is extended or adjusted under 35 U.S.C. 154(b) by 75 days.

(21) Appl. No.: 11/879,600

(22) Filed: Jul. 17, 2007

(65) Prior Publication Data

US 2009/0019788 A1 Jan. 22, 2009

(51) Int. Cl.

| | |
|---|---|
| ***E02D 37/00*** | (2006.01) |
| ***E04F 13/04*** | (2006.01) |
| ***E04F 13/00*** | (2006.01) |
| ***E04B 9/00*** | (2006.01) |
| ***E04B 1/38*** | (2006.01) |
| ***E04B 2/00*** | (2006.01) |
| ***E04C 5/00*** | (2006.01) |
| ***A47F 7/14*** | (2006.01) |
| ***A47G 1/16*** | (2006.01) |
| ***A47G 1/04*** | (2006.01) |
| ***B60R 1/02*** | (2006.01) |
| ***E05D 15/00*** | (2006.01) |
| ***B32B 7/00*** | (2006.01) |
| ***B32B 3/10*** | (2006.01) |
| ***B32B 43/00*** | (2006.01) |
| ***B29C 73/00*** | (2006.01) |

(52) U.S. Cl. ........... 52/514; 52/357; 52/700; 248/475.1; 248/488; 16/90; 428/119; 428/131; 156/71; 156/94

(58) Field of Classification Search .................... 40/790; 52/357, 511, 512, 514, 514.5, 582.1, 582.2, 52/584, 698, 699, 700, 712, 713, 714, 715; 16/90; 248/475.1, 488; 156/94, 98, 71; 428/119, 428/131

See application file for complete search history.

(56) References Cited

U.S. PATENT DOCUMENTS

| | | | | |
|---|---|---|---|---|
| 1,857,966 | A * | 5/1932 | Long | 40/790 |
| 1,879,457 | A * | 9/1932 | Paulsen | 52/714 |
| 2,351,525 | A * | 6/1944 | Leary | 52/285.3 |
| 3,715,824 | A * | 2/1973 | Rochman | 40/740 |
| 3,769,730 | A * | 11/1973 | Dole | 40/732 |
| 4,178,730 | A * | 12/1979 | Rowinski | 52/514 |
| 4,333,286 | A * | 6/1982 | Weinar | 52/281 |
| 4,467,578 | A * | 8/1984 | Weinar | 52/281 |
| 4,644,723 | A * | 2/1987 | Weber | 52/514 |
| 4,995,605 | A * | 2/1991 | Conville | 52/770 |
| 5,079,888 | A * | 1/1992 | Hileman et al. | 52/514 |
| 5,687,528 | A * | 11/1997 | Rouch | 52/514 |
| D391,149 | S * | 2/1998 | Gonzales | D8/388 |
| 6,209,277 | B1 * | 4/2001 | DiGate | 52/514 |
| 6,640,516 | B1 * | 11/2003 | Thompson | 52/712 |
| 2004/0045245 | A1 * | 3/2004 | O'Brien | 52/514 |
| 2007/0125035 | A1 * | 6/2007 | Herbold | 52/698 |

* cited by examiner

*Primary Examiner* — Philip Tucker
*Assistant Examiner* — Brian R Slawski
(74) *Attorney, Agent, or Firm* — Raymond Y. Chan; David and Raymond Patent Firm

(57) ABSTRACT

A hidden edge connector includes a connector body which includes a base guider for biasing against a rear surface of a frame, an edge guider for biasing against a surrounding surface of a frame opening, and a panel guider which is extended from the base guider and is perpendicular to the edge guider. The connector body is adapted for mounting to the frame at the frame opening thereof to keep a front surface of the frame in a clean and obstructing free manner, such that the connector body is adapted for guiding the panel being mounted within the frame opening in a hidden manner when a rear surface of the panel is biased against the panel guider to align with the rear surface of said frame so as to substantially align the front surface of the panel with a front surface of the frame.

4 Claims, 8 Drawing Sheets

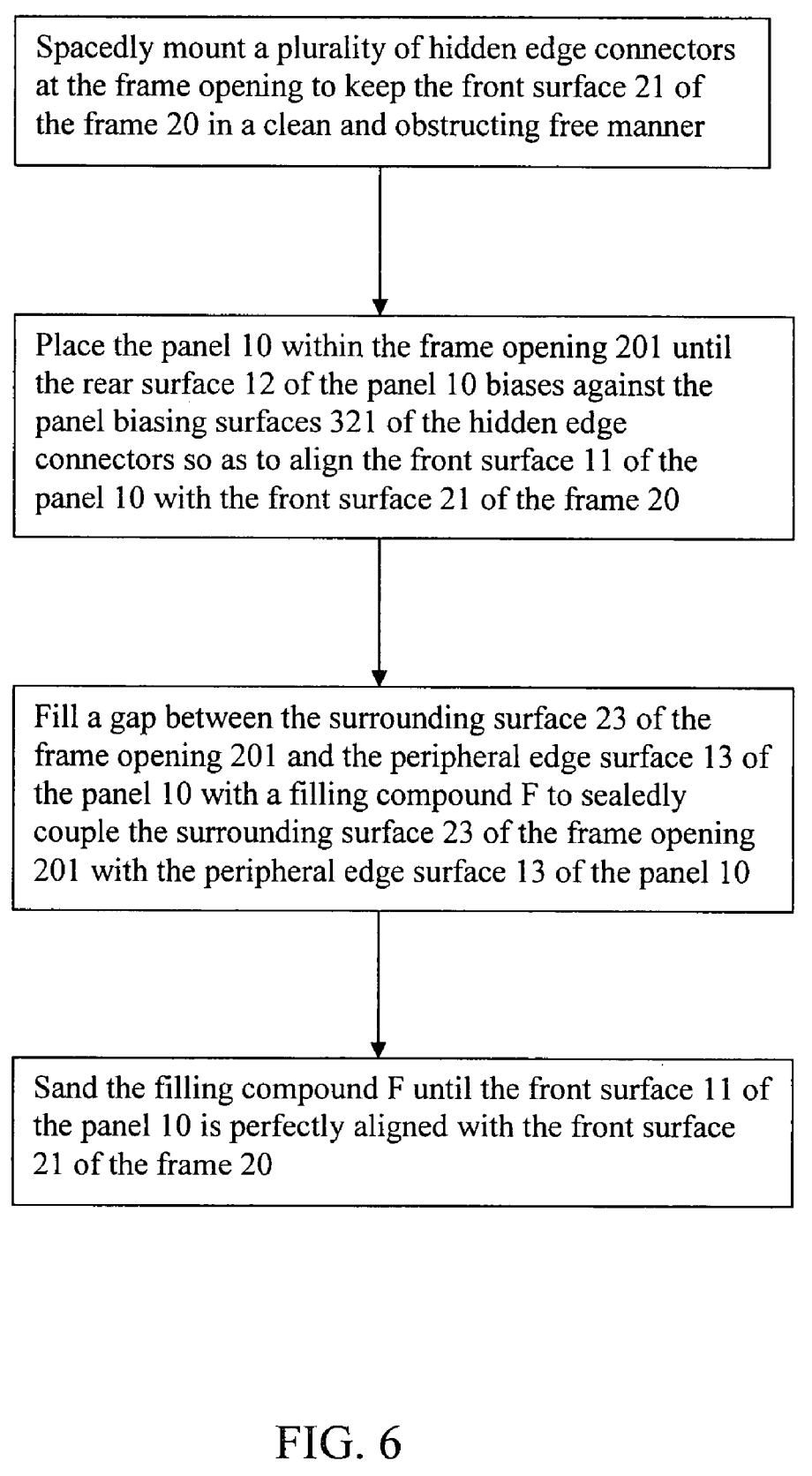

Spacedly mount a plurality of hidden edge connectors at the frame opening to keep the front surface 21 of the frame 20 in a clean and obstructing free manner

↓

Place the panel 10 within the frame opening 201 until the rear surface 12 of the panel 10 biases against the panel biasing surfaces 321 of the hidden edge connectors so as to align the front surface 11 of the panel 10 with the front surface 21 of the frame 20

↓

Fill a gap between the surrounding surface 23 of the frame opening 201 and the peripheral edge surface 13 of the panel 10 with a filling compound F to sealedly couple the surrounding surface 23 of the frame opening 201 with the peripheral edge surface 13 of the panel 10

↓

Sand the filling compound F until the front surface 11 of the panel 10 is perfectly aligned with the front surface 21 of the frame 20

FIG. 6

HIDDEN EDGE CONNECTOR FOR MOUNTING PANEL TO FRAME OPENING

BACKGROUND OF THE PRESENT INVENTION

1. Field of Invention

The present invention relates to a hidden edge connector for mounting panel to frame opening, more particularly to a hidden edge connector which provides a method, for not only securely fixing the panel on a wall or a picture frame but also keeping a front surface of the wall or frame in a clean and obstructing free manner.

2. Description of Related Arts

Many homeowners would like to do home improvement during weekends. Unless the job is particularly difficult or requires a certain skill to be completed, the homeowners would like to be "do-it-yourselfers" to reduce the labor expense of the contractor. For example, repairing a dry wall and the same is considered as a simple job for the do-it-yourselfers.

Generally speaking, a handy man uses spackling compound to repair small cracks or nail holes at the dry wall. However, in order to repair a bigger hole, some tips may be very useful. First, the handy man will cut a larger opening on the wall through the hole and prepare a repairing panel having a size fitting into the opening. Then, a plurality of panel mounts are used for affixing to the surrounding edge of the opening to retain the repairing panel within the opening. Lastly, the spackling compound is filled to seal the gap between the wall and the repairing panel. However, such panel mount has several drawbacks.

Accordingly, a conventional panel mount comprises a U-shaped wall holder defining a holding slot arranged to mount at the front side and rear side of the wall at the surrounding edge of the opening and a holding panel extended to hold the repairing panel at a rear side thereof. Therefore, when the repairing panel is disposed within the opening, the rear side of the repairing panel is biased against the holding panel to retain the repairing panel in position. However, the width of the holding slot must be configured corresponding to the thickness of the wall. If the width of the holding slot is slightly larger than the thickness of the wall, the panel mount cannot be securely affixed to the wall at the surrounding edge of the opening to hold the repairing panel in position.

In addition, since the wall holder of the panel mount must be affixed to the front side of the wall, the wall surface cannot be fixed to form an even surface after the spackling compound is filled and sanded. Therefore, the wall cannot be repaired to have the original flat wall surface once the panel mount is used. In other words, the front side of the wall cannot be perfectly aligned with the front side of the repairing panel.

Furthermore, the spackling compound can only be filled at the front sides of the wall and the repairing panel. Therefore, the spackling compound may not be strong enough to bond the repairing panel within the opening. Once an exterior force, such as earthquake or an impact force, is exerted at the repairing panel, a crack will formed thereat. If the exterior force is large enough to break the bond of the spackling compound at the front side of the wall, the repairing panel may even be dislocated within the opening.

SUMMARY OF THE PRESENT INVENTION

A main object of the present invention is to provide a hidden edge for mounting a panel to a frame opening, wherein the structure of the connector body is simple but practical for not only securely fixing the panel on a wall or a picture frame but also keeping a front surface of the wall or frame in a clean and obstructing free manner.

Another object of the present invention is to provide a hidden edge for mounting a panel to a frame opening, which can attach the frame opening without any tools.

Another object of the present invention is to provide a hidden edge for mounting a panel to a frame opening, wherein sparkling compound can be filled between the surrounding surface of the frame opening and a peripheral edge surface of the panel to increase the adhesive force therebetween for providing the firm foundation on the wall.

Accordingly, in order to accomplish the above objects, the present invention provides a hidden edge for mounting panel to frame opening, wherein the hidden edge comprises a connector body which comprises a base guider for biasing against a rear surface of the frame, an edge guider perpendicularly extended from the base guider for biasing against a surrounding surface of the frame opening when the base guider is biased against the rear surface of the frame, and a panel guider which is extended from the base guider and is perpendicular to the edge guider, such that the panel guider is extended for aligning with the rear surface of the frame within the frame opening.

Accordingly, the connector body is adapted for mounting to the frame at the frame opening thereof to keep a front surface of the frame in a clean and obstructing free manner, such that the connector body is adapted for guiding the panel being mounted within the frame opening in a hidden manner when a rear surface of the panel is biased against the panel guider to align with the rear surface of the frame so as to substantially align a front surface of the panel with the front surface of the frame.

The present invention further provides a method of mounting a panel within a frame opening of a frame, comprising the steps of:

(a) spacedly mounting a plurality of hidden edge connectors at the frame opening to keep a front surface of the frame in a clean and obstructing free manner;

(b) placing the panel within the frame opening until the rear surface of the panel biases against the panel biasing surfaces of the hidden edge connectors so as to align a front surface of the panel with the front surface of the frame;

(c) filling a gap between the surrounding surface of the frame opening and a peripheral edge surface of the panel with a filling compound to sealedly couple the surrounding surface of the frame opening with the peripheral edge surface of the panel; and (d) sanding the filling compound until the front surface of the panel is perfectly aligned with the front surface of the frame.

These and other objectives, features, and advantages of the present invention will become apparent from the following detailed description, the accompanying drawings, and the appended claims.

BRIEF DESCRIPTION OF THE DRAWINGS

FIG. 6 is a flow diagram illustrating a method of mounting a panel within a frame opening of a frame according to the above preferred embodiment of the present invention.

DETAILED DESCRIPTION OF THE PREFERRED EMBODIMENT

Figure 1:
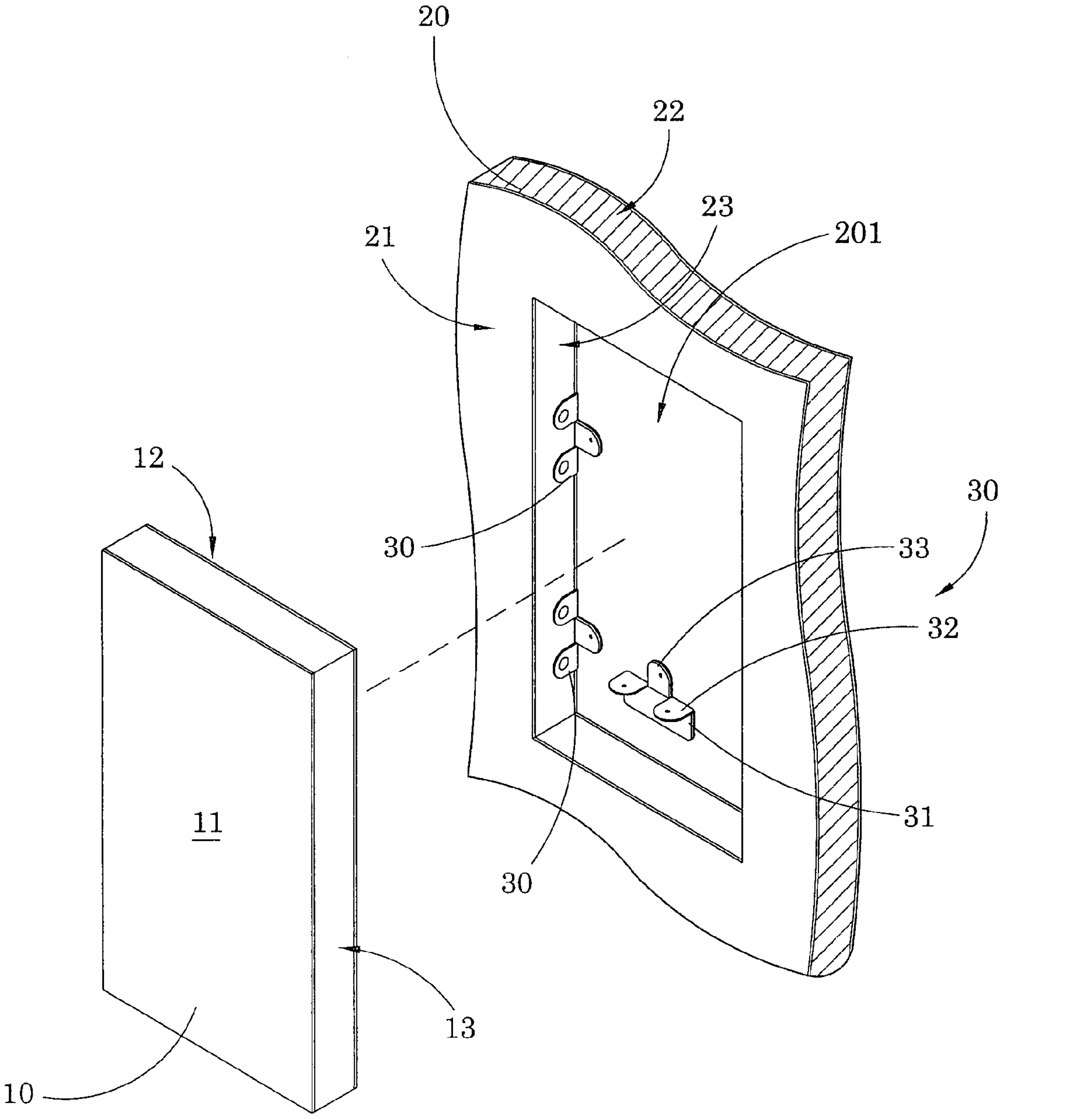
FIG. 1 is a perspective view of a panel mounting to a frame opening of a wall via a hidden edge connector according to a preferred embodiment of the present invention.

Referring to FIGS. 1 and 2 of the drawing, a hidden edge connector for mounting a panel 10 to a frame opening 201 of a frame 20 according to a prefer embodiment of the present invention is illustrated, wherein the hidden edge connector of the present invention is arranged for use in mounting the panel 10 as a repairing panel to a wall opening of a wall as the frame opening 201 of the frame 20 to repair the wall.

Accordingly, the panel 10 has a front surface 11, a rear surface 12, and a peripheral edge surface 13. The frame 20 has a front surface 21, a rear surface 22, and a surrounding surface 23 defining as a surrounding wall of the frame opening 201. The thickness of the panel 10 is corresponding to the thickness of the frame 20 such that when the panel 10 is disposed within the frame opening 201 of the frame, the front and rear surfaces 11, 12 of the panel 10 are aligned with the front and rear surfaces 21, 22 of the frame 20 respectively. The hidden edge connector comprises a connector body 30 for retaining the panel 10 within the frame opening 201 of the frame 20 in position, and a fastening arrangement 40 for mounting the connector body 30 at the frame opening 201.

Figure 2A:
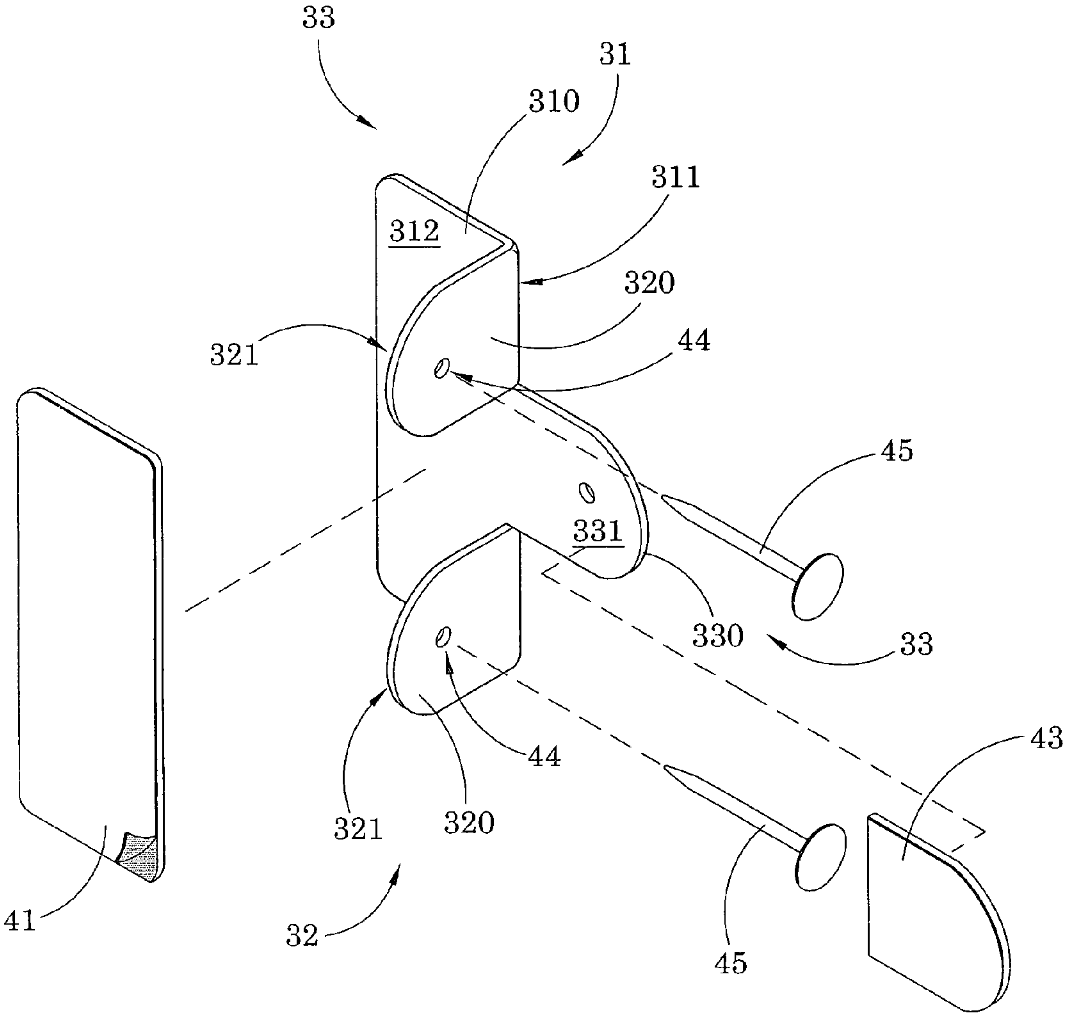
FIG. 2A is a perspective view of a hidden edge connector according to the above preferred embodiment of the present invention.

As shown in FIG. 2A, the connector body 30 comprises a base guider 31, an edge guider 32, and a panel guider 33. The base guider 31 is arranged for biasing against the rear surface 22 of the frame 20. The edge guider 32 is perpendicularly extended from the base guider 31 for biasing against the surrounding surface 23 of the frame opening 201 when the base guider 31 is biased against the rear surface 22 of the frame 20. The panel guider 33 is extended from the base guider 31 and is perpendicular to the edge guider 32, such that the panel guider 33 is extended for aligning with the rear surface 23 of the frame 20 within the frame opening 201.

Accordingly, the connector body 30 is adapted for mounting to the frame 20 at the frame opening 201 thereof to keep the front surface 21 of the frame 20 in a clean and obstructing free manner, such that the connector body 30 is adapted for guiding the panel 10 being mounted within the frame opening 201 in a hidden manner when the rear surface 12 of the panel 10 is biased against the panel guider 33 to align with the rear surface 22 of the frame 20 so as to substantially align the front surface 11 of the panel 10 with the front surface 21 of the frame 20.

Figure 3:
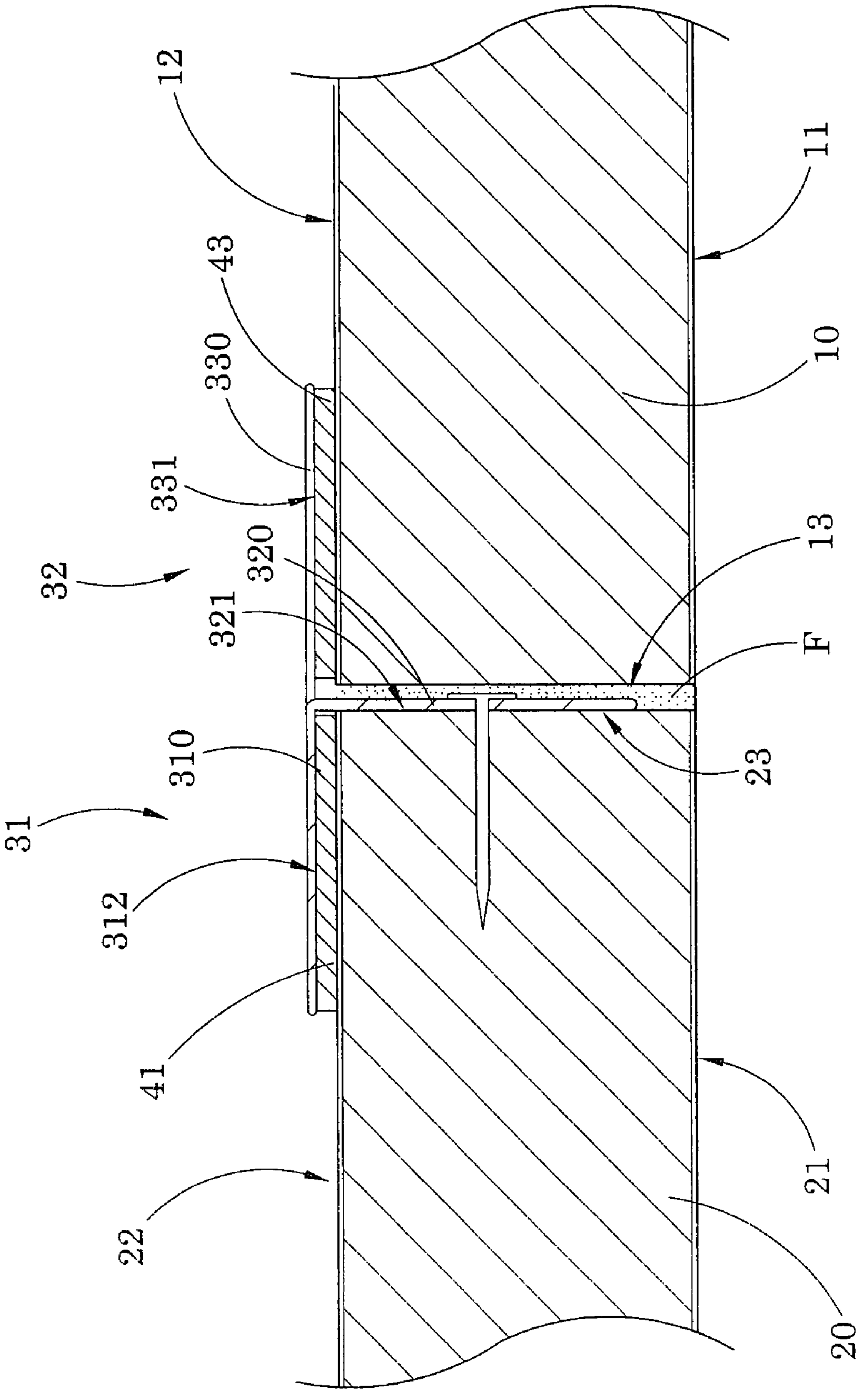
FIG. 3 is a schematic view illustrating the bonding between the wall and the panel through the hidden edge connector and the sealing element being filled according to the above preferred embodiment of the present invention.

As shown in FIGS. 2A and 3, the base guider 31 comprises a base panel 310 having a guiding edge 311 and a frame biasing surface 312 adapted for biasing against the rear surface 22 of the frame 20, wherein the edge guider 32 and the panel guider 33 are spacedly and integrally extended from the base panel 310 along the guiding edge 311 thereof, such that when the frame biasing surface 312 of the base panel 31 is biased against the rear surface 22 of the frame 20, the edge guider 32 is guided for biasing against the surrounding surface 23 of the frame opening 210 while the panel guider 33 is guided for extending within the frame opening 210 to align with the rear surface 22 of the frame 22.

The panel guider 33 comprises at least one guiding panel 330 extended from the base panel 310 to guide the panel 10 within the frame opening 201. As shown in FIG. 3, the guiding panel 330, having a panel biasing surface 331, is integrally extended from the base panel 310 at the guiding edge 311 thereof in a planar direction, such that the panel biasing surface 331 of the guiding panel 32 is integrally and alignedly extended from the frame biasing surface 311 of the base panel 310. In other words, the guiding panel 330 and the base panel 310 are formed in an integrated planar member.

The edge guider 32 comprises at least one edge panel 320 extended from the base panel 310 to align with the surrounding surface 23 of the frame opening 201. Accordingly, there are two edge panels 320 integrally and spacedly extended from the base panel 310 at a position that the guiding panel 330 is positioned between the two edge panels 320, as shown in FIG. 3. Each of the edge panels 320, having a length smaller than a thickness of the frame 20, has an edge biasing surface 321 for biasing against the surrounding surface 23 of the frame opening 201.

Accordingly, the base guider 31, the panel guider 32, and the edge guider 32 are formed to have a T-shaped integrated structure to couple the panel 10 with the frame 20 at the frame opening 201 thereof, as shown in FIG. 3.

Figure 4:
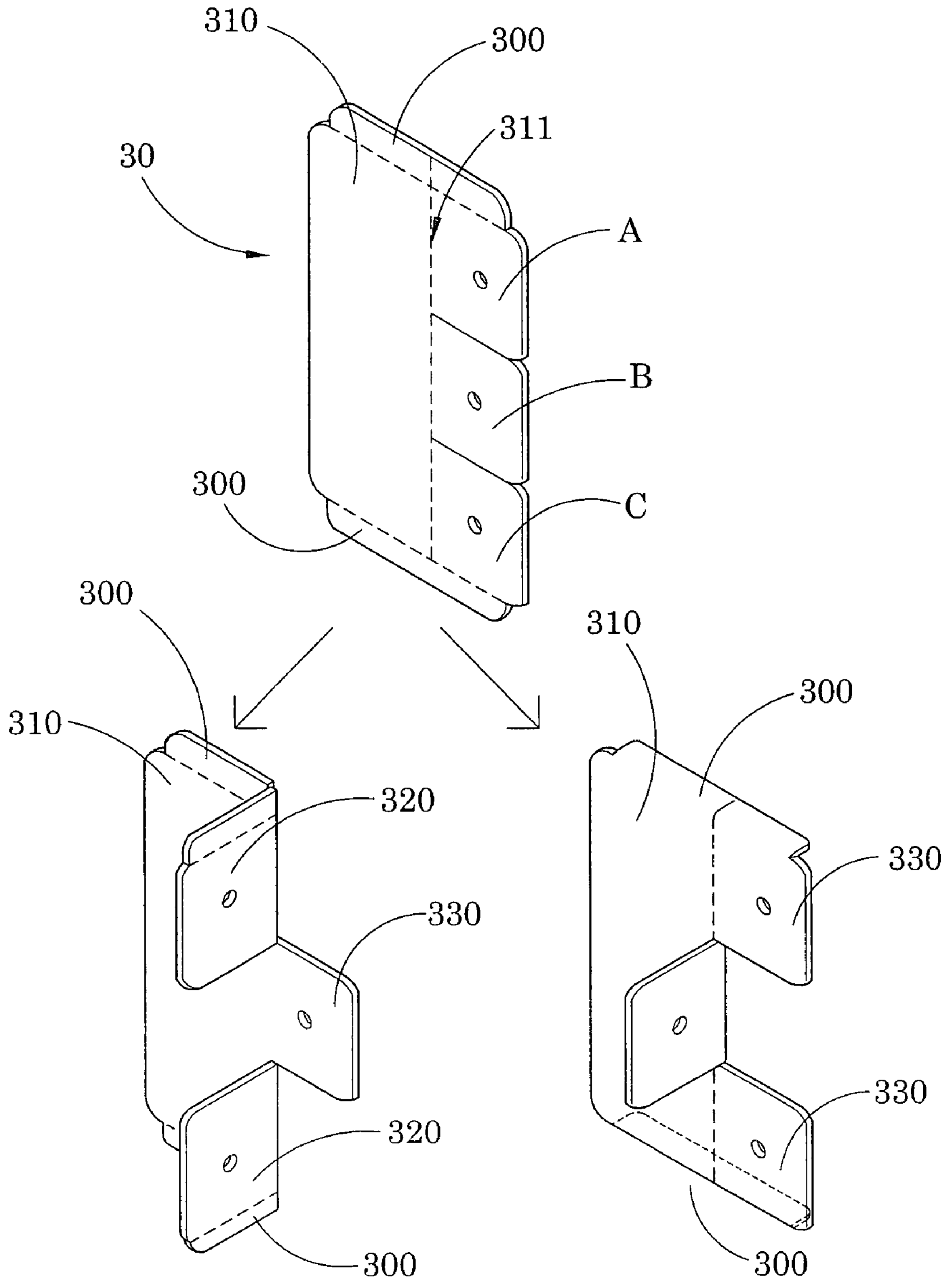
FIG. 4 is a schematic view of the hidden edge connector according to the above preferred embodiment of the present invention, illustrating the hidden edge connector being selectively configured its structure.

According to the preferred embodiment, the connector body 30 can be selectively bent to form the guiding panel 330 and the edge panel 320. As shown in FIG. 4, there are three bendable panels A, B, C integrally and spacedly extended from the guiding edge 311 of the base panel 310, wherein each of the bendable panels is adapted to be bent 90° to form either the guiding panel 330 or the edge panel 320. For example, two edge panels 320 are formed by bending the first and third bendable panels A, C at 90° with respect to the base panel 310, wherein the second bendable panel B, which is positioned between the first and third bendable panels A, C, forms the guiding panel 330. Likewise, two guiding panels 330 are formed by bending only the second bendable panel B to form the edge panel 320 such that the first and third bendable panels A, C form the two guiding panels 330 respectively.

It is worth to mention that when two guiding panels 330 are formed, two reinforcing rims 300 are formed at upper and lower edges of the connector body 30, as shown in FIG. 4, to reinforce the structure of the guiding panels 330 to withstand the force from the panel 10 to the guiding panel panels 330 when the panel 10 is disposed in the frame opening 201. Accordingly, each of the reinforcing rims 300 is bent rearwardly along the respective edge of the connector body 30.

According to the preferred embodiment, each of the edge panels 320 is perpendicularly bent with respect to the base panel 310 along the guiding edge 311 thereof such that the edge biasing surface 321 of each of the edge panels 320 is 90° extended from the frame biasing surface 312 of the base panel 310.

As shown in FIG. 2A, the fastening arrangement 40 contains a pin hole 44 provided on the edge panel 320 for a pin 45 penetrating into the surrounding surface 23 of the frame opening 201 through the pin hole 44 for substantially attaching the edge biasing surface 321 of the edge panel 320 to the surrounding surface 23 of the frame opening 201. Accordingly, the pin 45 should have a flat enlarged head and a pin body extending therefrom such that when the pin body is inserted into the surrounding surface 23 of the frame opening 201 through the pin hole 44, the enlarged head of the pin 45 is adapted to bias against the edge panel 320. It is worth to worth that the enlarged head of the pin 45 can minimize the gap between the edge panel 320 and the peripheral edge surface 13 of the panel 10.

Figure 2B:
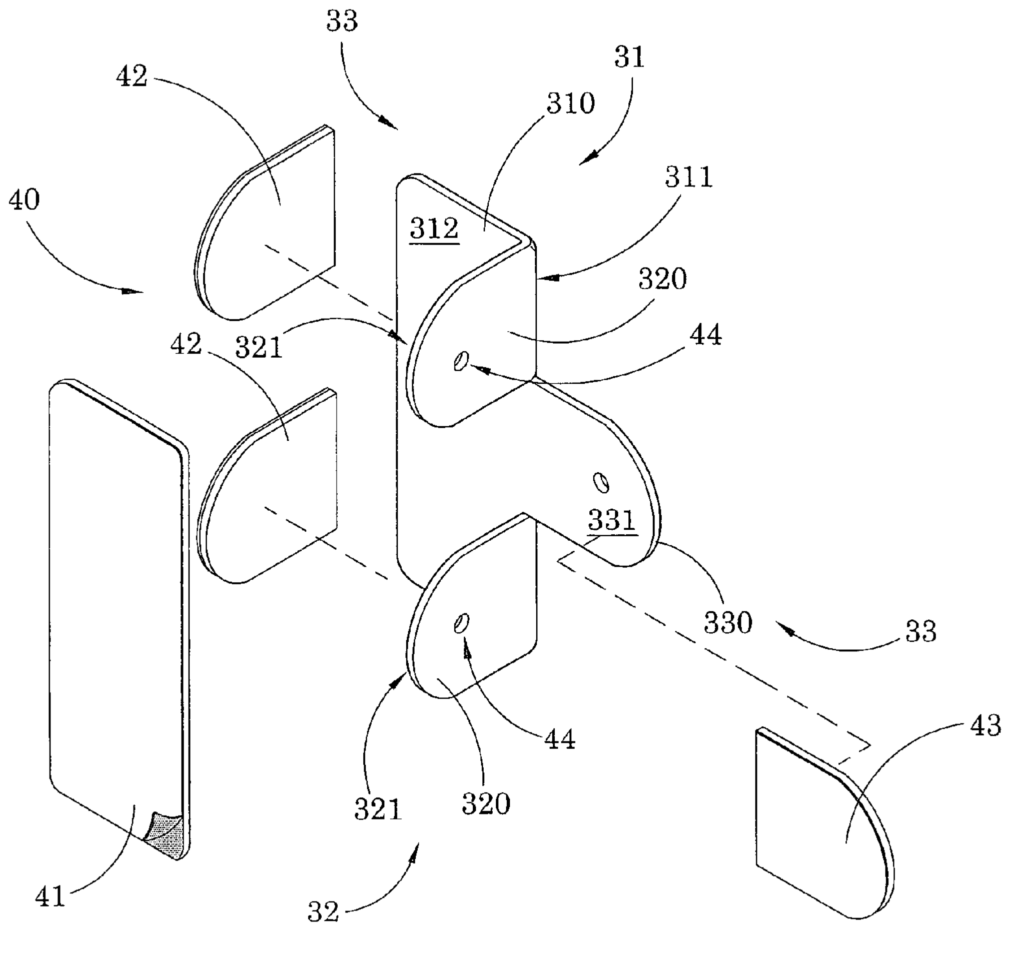
FIG. 2B illustrates an alternative mode of the fastening arrangement of the hidden edge connector according to the above preferred embodiment of the present invention.

Alternatively, the fastening arrangement 40 comprises a double-sided adhesive layer 41 provided on the frame biasing surface 312 of the base panel 310 for substantially attaching the frame biasing surface 312 of the base panel 310 to the rear surface 22 of the frame 20, as shown in FIG. 2B. In addition, an additional double-sided adhesive layer 42 is provided on the edge biasing surface 321 of each of the edge panels 320 for substantially attaching the edge biasing surface 321 of the edge panel 320 to the surrounding surface 23 of the frame opening 201. Accordingly, the double-sided adhesive layers 41, 42 are adapted to retain the connector body 30 at the frame 20 by holding the base panel 310 at the rear surface 22 of the frame 20 and the guiding panel 330 at the surrounding surface 23 of the frame opening 201. It is worth to mention that a third double-sided adhesive layer 43 can be provided at the panel biasing surface 331 of the guiding panel 330 such that when the rear surface 12 of the panel 10 is biased against the panel biasing surface 331 of the guiding panel 330, the third double-sided adhesive layer 43 is adapted to hold the panel 10 within the frame opening 201 in position.

It is worth to mention that the pin 45 and the double-sided adhesive layers 41, 42, 43 can be used at the same time for enhancing the retention of the connector body 30 at the frame opening 201.

Figure 5:
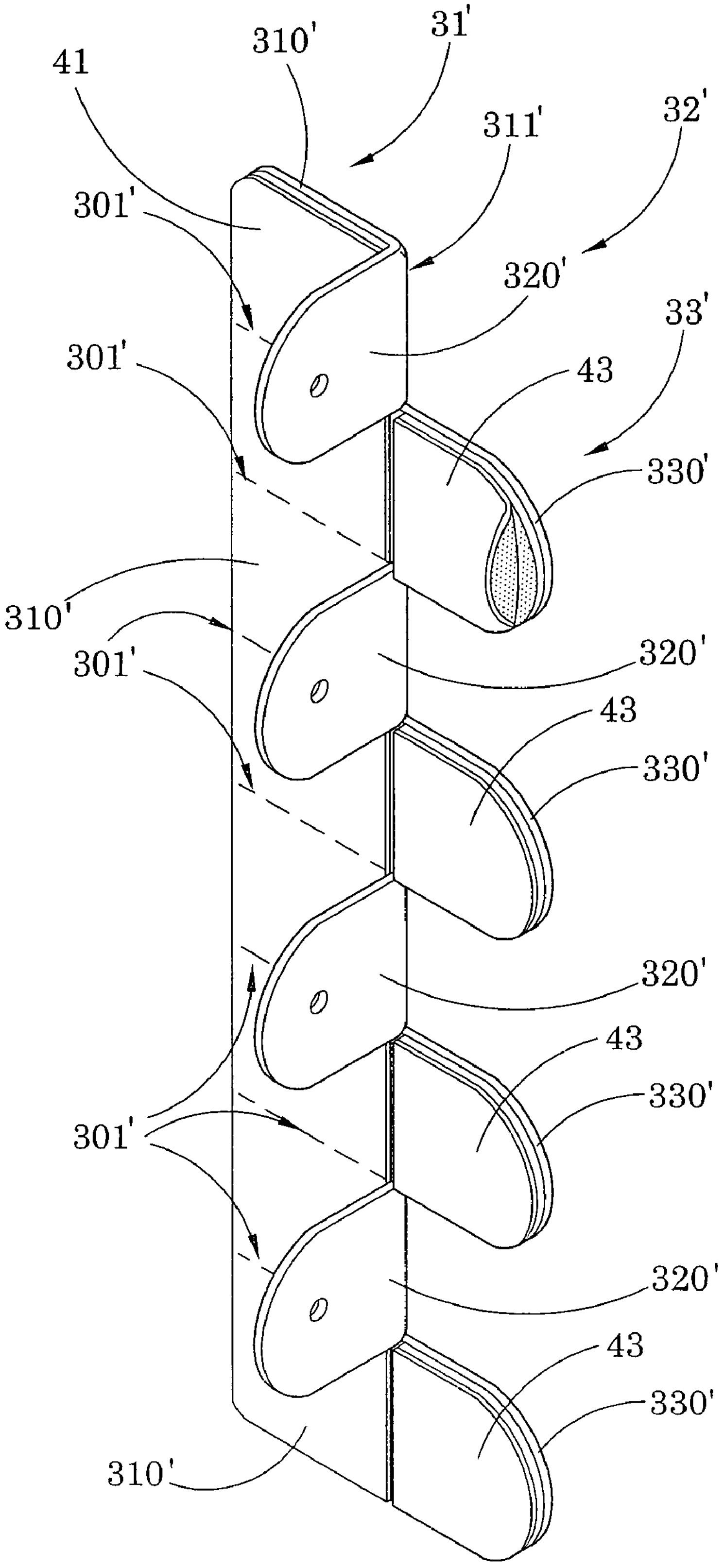
FIG. 5 illustrates an alternative mode of the hidden edge connector according to the above preferred embodiment of the present invention.

FIG. 5 illustrates an alternative mode of the connector body 30', wherein the connector body 30' comprises a base guider 31', an edge guider 32', and a panel guider 33'. The base guider 31' comprises a base panel 310' having a guiding edge 311'. The panel guider 32' comprises a plurality of guiding panels 320' spacedly extended from the base panel 310' to guide the panel 10 within the frame opening 201. The edge guider 32' comprises a plurality of edge panels 320' spacedly extended from the base panel 310' to align with the surrounding surface 23 of the frame opening 201.

As shown in FIG. 5, the guiding panels 330' and the edge panels 320' are integrally extended from the guiding edge 311' of the base panel 310', wherein the guiding panels 330' are alternating with the edge panels 320'. In addition, the connector body 30' further contains a plurality of broken lines 301' spacedly provided at the base panel 310' corresponding to the guiding panels 330' and the edge panels 320' such that the base panel 310' is adapted to be broken into several pieces to adjust the size of the base panel 310'. In other words, the user is able to select the numbers of guiding panels 330' and the edge panels 320' to be used in responsive to the size of the frame opening 201. For a larger size of the frame opening 201, the user can break the base panel 310' that two guiding panels 330' and three edge panels 320' are extended therefrom. For a smaller size of the frame opening 201, the user can break the base panel 310' that one guiding panel 330' and one edge panel 320', i.e. the minimum configuration, are extended therefrom.

As shown in FIG. 6, the present invention further provides a method of mounting the panel 10 within the frame opening 201 of the frame 20, comprising the following steps.

(1) Spacedly mount a plurality of hidden edge connectors at the frame opening to keep the front surface 21 of the frame 20 in a clean and obstructing free manner.

(2) Place the panel 10 within the frame opening 201 until the rear surface 12 of the panel 10 biases against the panel biasing surfaces 321 of the hidden edge connectors so as to align the front surface 11 of the panel 10 with the front surface 21 of the frame 20.

(c) Fill a gap between the surrounding surface 23 of the frame opening 201 and the peripheral edge surface 13 of the panel 10 with a filling compound F to sealedly couple the surrounding surface 23 of the frame opening 201 with the peripheral edge surface 13 of the panel 10.

(4) Sand the filling compound F until the front surface 11 of the panel 10 is perfectly aligned with the front surface 21 of the frame 20.

Accordingly, the number of hidden edge connector of the present invention can be used depending on the size of the frame opening 201 and/or the size of the hidden edge connector. Preferably, four hidden edge connectors should be used for the panel 10 having a rectangular shape.

As it is mentioned above, the conventional method can only fill the gap between the front surface 11 of the panel 10 and the front surface 21 of the frame 20 via the filling compound such that the bonding force between the pane 10 and the frame 20 is relatively weak. According to the preferred embodiment, the filling compound will be filled at the gap between the front surface 11 of the panel 10 and the front surface 21 of the frame 20. In addition, in step (3), the filling compound is filled at the gap a gap between the surrounding surface 23 of the frame opening 201 and the peripheral edge surface 13 of the panel 10 as shown in FIG. 3. Therefore, the adhesive bonding force between the panel 10 and the frame 20 will be substantially stronger for providing a firm foundation on the frame 20 within the frame opening 201 thereof. Accordingly, the filling compound is sparkling compound.

Figure 7:
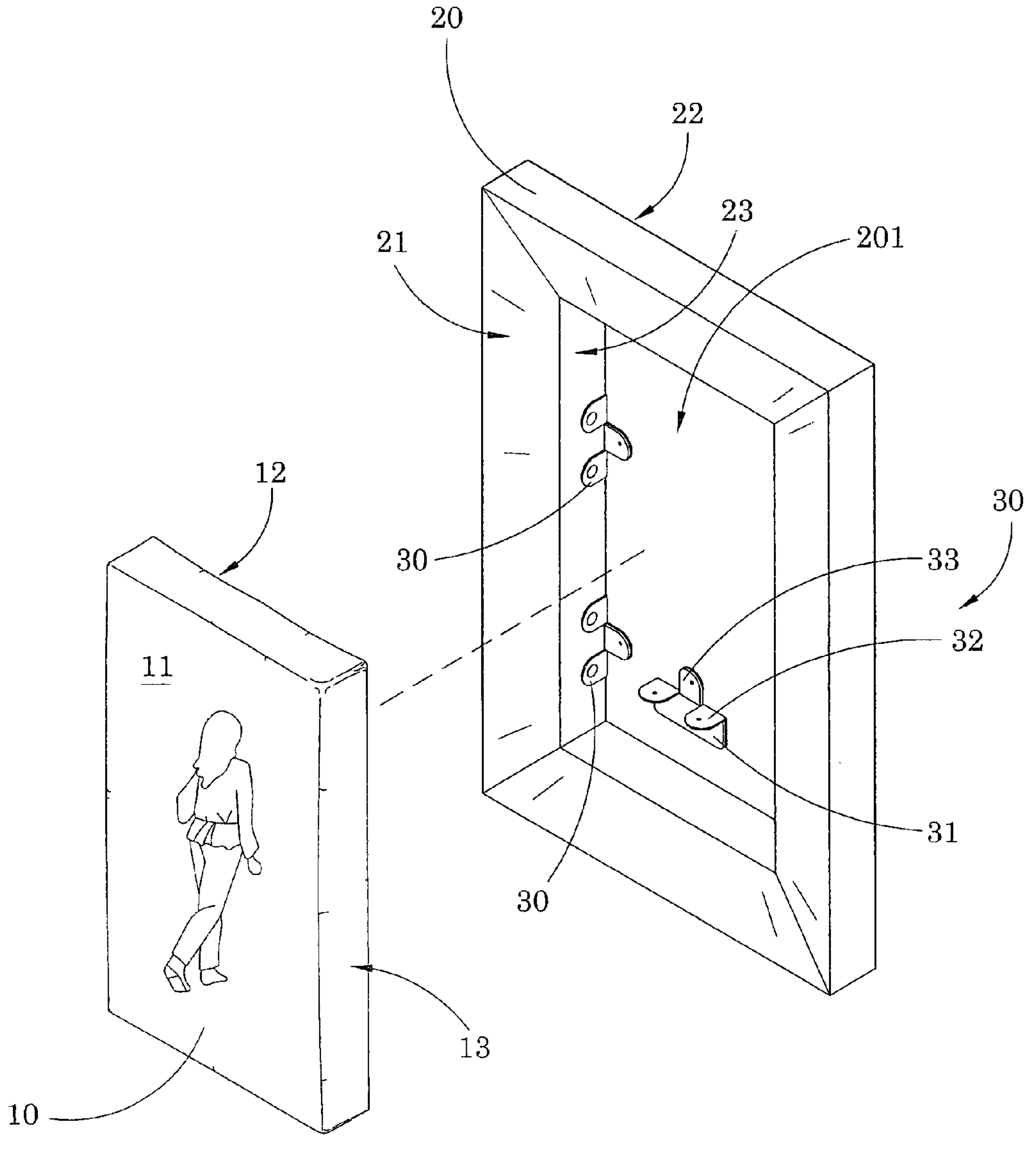
FIG. 7 illustrates the hidden edge connector in use for a picture frame according to the above preferred embodiment of the present invention.

It is worth to mention that the hidden edge connector of the present invention is also adapted for use in a picture frame. As shown in FIG. 7, the frame 20 is embodied as the picture frame defining the frame opening 201 therewithin, wherein the picture panel is embodied as the panel 10 to mount within the frame opening 201 of the picture frame. Therefore, the picture panel is adapted to not only securely mount at the frame opening 201 of the picture frame but also keep the front surface of the picture panel in a clean and obstructing free manner.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A hidden edge connector for mounting a drywall panel to a drywall opening of a drywall as a repairing panel for repairing the drywall, wherein the drywall opening has two opposed edges, wherein the repairing panel has a size slightly smaller than that of the drywall opening and a thickness of the repairing panel corresponds to a thickness of the drywall such that when the repairing panel is disposed within the drywall opening, front and rear surfaces of the repairing panel are substantially aligned with front and rear surfaces of the drywall respectively, wherein said hidden edge connector comprises two connector bodies arranged for mounting at the two opposed edges of the drywall opening of the drywall, wherein each of the connector bodies comprises:

a base guider comprising a base panel having a guiding edge and a biasing surface arranged for biasing against the rear surface around the drywall opening of the drywall, wherein a first double-sided adhesive layer is provided on said biasing surface of said base panel to substantially hold said biasing surface of said base panel at the rear surface around the drywall opening of the drywall without damaging the rear surface of the drywall;

an edge guider which is perpendicularly extended from said guiding edge of said base guider, wherein said edge guider, having a length smaller than a thickness of the drywall, has an edge biasing surface for biasing against a surrounding surface of the drywall opening when said base guider is adhered against the rear surface of the drywall, wherein said edge guider has a pin hole provided thereat for a pin penetrating into the surrounding surface of the drywall opening through said pin hole to secure said edge guider at the surrounding surface of the drywall opening so as to affix said base guider at the rear surface of the drywall; and a panel guider extended from said base panel and is perpendicular to said edge guider in such a manner that said panel guider is extended for aligning with the rear surface of the drywall within the drywall opening when said hidden edge connector is mounted at the drywall opening of the drywall while keeping the front surface of the drywall in a clean and obstructing free manner, wherein said panel guider has a panel biasing surface integrally extended from said base panel at said guiding edge thereof in a planar direction, wherein said panel biasing surface is integrally and alignedly extended from said biasing surface of said base panel, wherein said panel guider has two reinforcing rims formed at upper and lower edges thereof to reinforce a structure of said panel guider, so that said panel guider is arranged to substantially guide the repairing panel to be mounted within the drywall opening in a hidden manner when the rear surface of the repairing panel is biased against said panel guider to align with the rear surface of the drywall so as to substantially align the front surface of the repairing panel with the front surface of the drywall;

wherein said edge guider and said panel guider are spacedly and integrally extended from said base panel along said guiding edge thereof, such that when said biasing surface of said base panel is retained against the rear surface of the drywall through said first adhesive layer, said edge guider is guided for biasing against the surrounding surface of the drywall opening while said panel guider is guided for extending within the drywall opening to align with the rear surface of the drywall;

wherein said edge guider is sandwiched between the surrounding surface of the drywall opening and a peripheral edge surface of the repairing panel to form a gap therebetween for enabling a filling compound being sealed at said gap to hide said edge guider behind the front surface of the drywall and to increase an adhesive force between the drywall and the repairing wall so as to provide a firm foundation on the drywall;

wherein said panel guider comprises a plurality of guiding panels spacedly extended from said base panel at said guiding edge thereof to guide the repairing panel within the drywall opening, wherein each of said guiding panels has said panel biasing surface and is integrally extended from said base panel at said guiding edge thereof in a planar direction, such that said panel biasing surface of each said guiding panel is integrally and alignedly extended from said biasing surface of said base panel, wherein a second double-sized adhesive layer is provided at each of said panel biasing surfaces for holding the rear surface of the repairing panel when the repairing panel is pushed within the drywall opening so as to retain the repairing panel within the drywall opening in position;

wherein said edge guider comprises a plurality of edge panels integrally and spacedly extended from said guiding edge of said base panel at a position, wherein said guiding panels are alternating with said edge panels that each of said guiding panels is positioned between two of said edge panels, wherein each of said edge panels, having a length smaller than a thickness of the drywall, has said edge biasing surface for biasing against the surrounding surface of the drywall opening, wherein said pin hole is formed at each of said guiding panels for the pins penetrating into the surrounding surface of the drywall opening through said pin holes.

2. The hidden edge connector, as recited in claim 1, wherein each of said connector bodies is made of bendable material and comprises a plurality of bendable panels integrally extended from said guiding edge of said base panel in a planar direction, wherein said bendable panels are selectively formed as said edge panels and said guiding panels, wherein said bendable panels are bent to form said edge panels when said bendable panels are bent perpendicularly to said base panel, wherein said bendable panels are unbent to form said guiding panels.

3. The hidden edge connector, as recited in claim 1, further comprising a plurality of third double-sided adhesive layers provided on said edge biasing surfaces of said edge panels respectively for substantially attaching said edge biasing surfaces of said edge panels to the surrounding surface of the drywall opening.

4. The hidden edge connector, as recited in claim 2, further comprising a plurality of third double-sided adhesive layers provided on said edge biasing surfaces of said edge panels respectively for substantially attaching said edge biasing surfaces of said edge panels to the surrounding surface of the drywall opening.

* * * * *